United States Patent [19]

Howell

[11] 4,230,432
[45] Oct. 28, 1980

[54] TRACK FASTENER

[75] Inventor: Russell B. Howell, Winston-Salem, N.C.

[73] Assignee: Fairchild Industries, Inc., Germantwon, Md.

[21] Appl. No.: 16,123

[22] Filed: Feb. 27, 1979

[51] Int. Cl.³ .......................... B60N 1/08; B60P 7/08; B61D 45/00
[52] U.S. Cl. ............................... 410/102; 248/503.1; 248/542; 297/346; 410/81; 410/105
[58] Field of Search ............... 105/482; 248/503, 500, 248/503.1, 542; 297/346; 410/81, 102, 105, 109, 113, 115

[56] References Cited

U.S. PATENT DOCUMENTS

| | | | |
|---|---|---|---|
| 3,212,457 | 10/1965 | Looker | 105/482 |
| 3,667,195 | 7/1972 | Prete, Jr. | 105/482 |
| 3,847,344 | 11/1974 | Kulczycki et al. | 248/503 |
| 4,062,298 | 12/1977 | Weik | 410/105 |
| 4,109,891 | 8/1978 | Grendahl | 410/102 X |

Primary Examiner—Howard Beltran
Attorney, Agent, or Firm—Michael W. York

[57] ABSTRACT

Track fastener apparatus for use in anchoring seats or cargo with a locking track that has a slot with spaced cut-out portions extending through the upper surface of the locking track from one side to the opposite side. The track fastener apparatus includes a housing and two track studs that are secured to the underside of the housing whose end portions are adapted to be received by the spaced cut-out portions. The track studs each have a shank portion that is adapted to slide within the slot in the locking track. The track fastener apparatus also includes a locking screw that has threads which are received by the threads of an aperture in the central portion of the housing and a track wedge member connected to the lower end portion of the locking screw which is shaped to have a portion thereof fit within the cut-out portions and another adjacent flange portion that rests upon the surface of the upper surface of the locking track that is adjacent to the cut-out portions when the locking screw is in its downward or locked position. Two nonmetallic track slide members are located on the underside of the housing so that these members will rest upon the upper surface of the locking track when the track fastener apparatus is located on the locking track. The track fastener apparatus also has features that indicate when it is in its unlocked condition.

8 Claims, 5 Drawing Figures

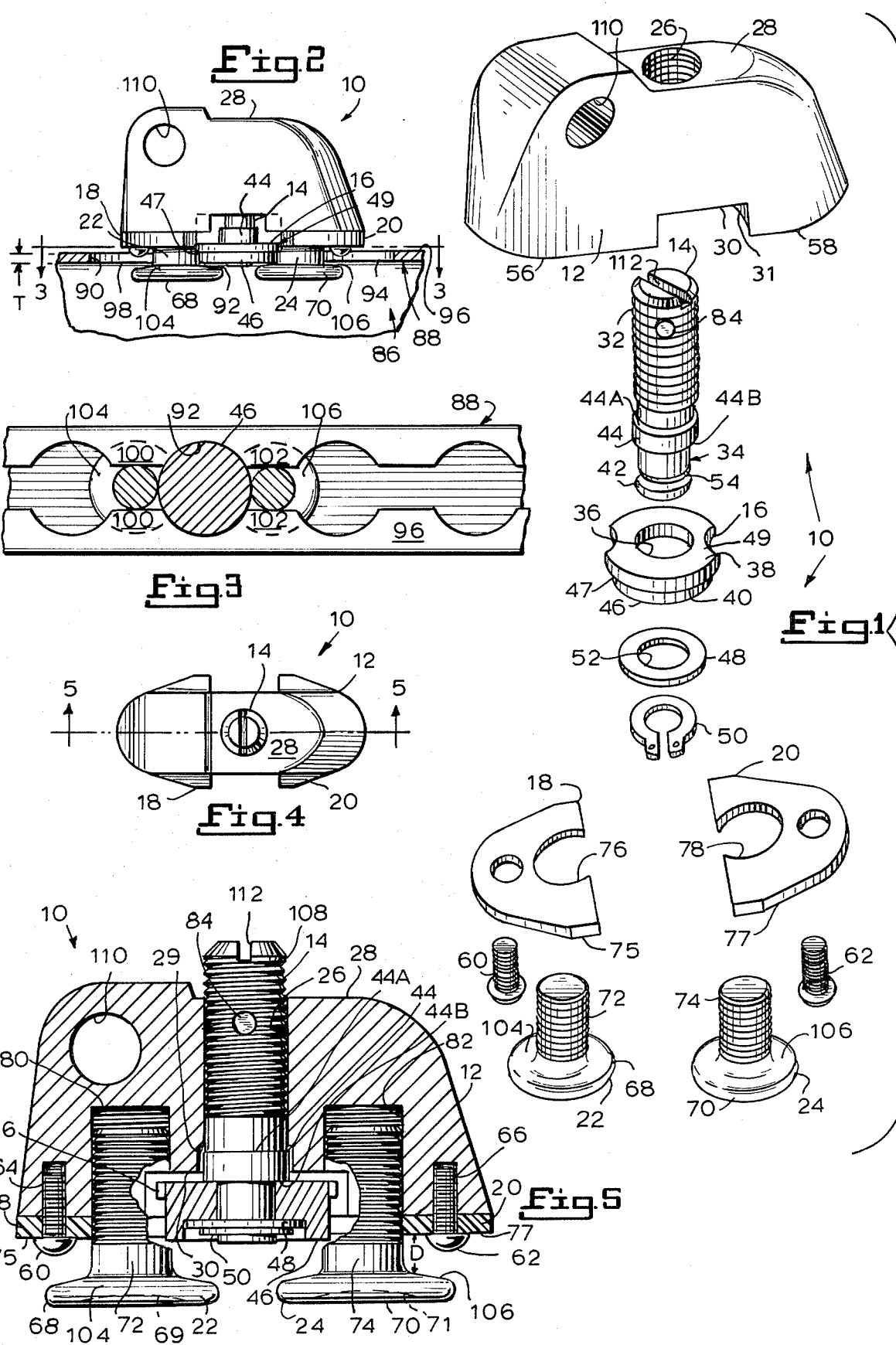

TRACK FASTENER

BACKGROUND OF THE INVENTION

Many vehicles need the capability for the addition or the removal of passenger seats and/or cargo. In addition, such vehicles also need the capability to easily relocate or reposition seats and/or cargo. This is particularly true in connection with aircraft where it is frequently necessary to change the spacing between seats to increase or decrease the passenger density throughout a portion or the entire aircraft. This would be the case where it was desired to change the density of loading of a particular aircraft from its normal first class and tourist density of loading configuration to an all economy or tourist configuration which might be the case in connection with charter operations. In addition, some flights, especially those that are scheduled late at night, may be reconfigured to handle both cargo and passengers in the compartment that is normally reserved for only passenger seats.

To provide this capability the manufacturers of aircraft and other vehicles have installed locking tracks that run lengthwise in the floor of the major compartment of the aircraft. These locking tracks commonly have a slot that runs the entire length of the track which is located on the upper surface of the locking track. Semicircular cut-out portions that extend outward from this slot are located at equally spaced distances along the locking track. The purpose of the slot and the cut-out portions is to receive portions of various types of track fasteners to permit the track fasteners to be positioned along and locked to the track in order to secure passenger seats and/or cargo that is associated with the track fasteners to the locking tracks. In this manner passenger seats and/or cargo can be attached to and removed from the vehicle, or, if necessary, the passenger seats and/or cargo can be repositioned within the vehicle.

Any track fastener that is designed to cooperate with a locking track must be designed in a manner so that safety is the primary consideration. This is particularly true in connection with aircraft since a passenger seat that was not securely fastened to the locking track could easily cause injury to the occupant of the seat or to other occupants of the aircraft. Even in the case involving cargo located in the aircraft, it is necessary from a safety standpoint to insure that the cargo does not come loose since loose cargo could injure occupants of the aircraft and/or cause structual damage to the aircraft that could result in serious injury or the loss of life. From a safety standpoint any track fastener must have the ability to safely distribute the load to the track so that an unsafe load is not transmitted through only a few load distribution points in a manner that could cause an unsafe condition. It is also desirable for any track fastener to provide an indication of when the track fastener is properly locked to the locking track so that the person that is inspecting or installing the track fastener can readily determine if the track fastener is properly locked to the track. Without such an indication, the possibility of a fastener not being properly locked to the track would greatly increase, and this would have an adverse effect upon the safe operation of the vehicle.

From a practical standpoint any track fastener should be capable of being easily installed on and removed from the locking track so that passenger seats and/or cargo can easily be installed in and/or removed from a vehicle with a minimal amount of time and effort. Also since passenger seats and/or cargo may need to be shifted within a vehicle without removing the seats or cargo from the vehicle it is desirable to have track fasteners that will easily permit the moving or shifting of such seats and/or cargo.

In the past, attempts have been made to provide the features and capabilities that have been previously mentioned as being desirable in a track fastener. One such attempt is illustrated by the track fastener that is set forth in U.S. Pat. No. 3,847,344. The track fastener disclosed in this patent attempts to provide apparatus for indicating when it is properly secured to the locking track. This is accomplished by means of a locking wire that can be pivoted into position after the fastener has been placed in its locked position. However, the locking track fastener in this patent requires a separate distinct step in order to properly position the locking wire, and, in addition, the locking wire may be rotated into its partially locked position, and, hence, convey the impression to an observer that the locking fastener is in its locked position when in fact it is not. In addition, the track fastener set forth in this patent has portions that engage the track that do not permit the track fastener to be readily moved lengthwise along the track since these portions must be removed from the semicircular cut-out portion in the track. Consequently, even though the track fastener described in this patent has some provision for indicating when the fastener is locked to the track, the track fastener may also convey a false impression that it is locked. In addition, this track fastener is not as easy to install and remove from the track as would be desirable and it is not capable of being moved from one position on the track to another without removing it from the track.

Present invention overcomes these disadvantages and provides a track fastener that is easy to install and remove from a locking track that provides a positive indication when the track fastener is in its locked position. This track fastener also is capable of being moved along the length of the locking track without removing it from the track and consequently a seat or cargo that is attached to the fastener can easily be moved about within a vehicle without the necessity of lifting the seat or the cargo.

SUMMARY OF THE INVENTION

This invention relates to track fastener apparatus and more particularly to track fastener apparatus for use in vehicles.

It is accordingly an object of the present invention to provide a track fastener apparatus that is easy to connect to a locking track within a vehicle.

It is an object of the present invention to provide track fastener apparatus that is capable of being connected to a locking track in a vehicle in a minimal amount of time.

It is an object of the present invention to provide a track fastener apparatus that is capable of being utilized to fasten passenger seats and/or cargo to locking tracks in a vehicle in a safe manner.

It is an object of the present invention to provide track fastener apparatus that gives an indication when it has been safely locked to a vehicle locking track.

It is an object of the present invention to provide a track fastener apparatus that gives two types of indications when it is securely locked to a vehicle locking track.

It is an object of the present invention to provide track fastener apparatus that gives a visual indication when it is safely locked to a vehicle locking track and also such an indication that can be readily detected manually by an individual.

It is an object of the present invention to provide track fastener apparatus that gives a plurality of visual indications when it is safely locked to a locking track in a vehicle.

It is further object of the present invention to provide track fastener apparatus that distributes the load in a safe manner through a plurality of load transmitting areas.

It is a further object of the present invention to provide track fastener apparatus that readily permits passenger seats and/or cargo to be moved into and out of vehicles that have locking tracks.

It is also an object of present invention to provide a track fastener apparatus that readily permits passenger seats and/or cargo to be moved about or repositioned in a vehicle that has locking tracks.

It is also an object of the present invention to provide track fastener apparatus that permits passenger seats and/or cargo to be readily moved about within a vehicle that has locking tracks without the necessity of having to remove the track fastener apparatus from the locking track.

It is also an object of the present invention to provide track fastener apparatus that is adjustable to the particular type of locking track with which it will be used.

It is a further object of the present invention to provide track fastener apparatus that can be locked to a vehicle locking track by only manually applying force to one member.

It is a further object of the present invention to provide track fastener apparatus that is light in weight.

It is also an object of the present invention to provide track fastener apparatus that requires the use of a tool that unlocks it from a vehicle locking track.

The present invention provides track fastener apparatus for use with a locking track that has an upper surface portion with a slot with spaced cut-out portions extending through the upper surface portion of the locking track from one side to the opposite side thereof including a track fastener housing, means operatively connected to the housing for exerting pressure against one of the sides of the upper surface portion at two separate locations along the locking track surface portions between the spaced cut-out portions when the track fastener apparatus is in its locked configuration and means for exerting a force against the opposite side of the upper surface portion in the vicinity of one of the spaced cut-out portions when the track fastener apparatus is in its locked configuration.

BRIEF DESCRIPTION OF THE DRAWINGS

The invention will be hereinafter more fully described with reference to the accompanying drawings in which:

FIG. 1 is an exploded perspective view of the track fastener apparatus of the present invention;

FIG. 2 is a side elevational view of the track fastener apparatus illustrated in FIG. 1 when the track fastener apparatus is in its assembled or non-exploded configuration showing the track fastener apparatus fastened to a locking track;

FIG. 3 is a sectional view of the apparatus illustrated in FIG. 2 taken substantially on the line 3—3 thereof;

FIG. 4 is a top plan view of the track fastener apparatus illustrated in FIGS. 1 and 2 in its unlocked condition and detached from a locking track; and FIG. 5 is a sectional view of the track fastener apparatus illustrated in FIG. 4 taken substantially on the line 5—5 thereof.

DETAILED DESCRIPTION OF THE PREFERRED EMBODIMENT

Referring first to FIG. 1, the locking track apparatus is illustrated and designated generally by the number 10. The locking track apparatus 10 comprises a housing 12, a locking screw member 14, a track wedge member 16, two track slide members 18 and 20, and two locking track studs 22 and 24. A housing 12 has a threaded aperture 26 extending from its upper surface 28 to its lower surface 30. This aperture 26 is adapted and sized to receive the threaded portion 32 of the locking screw member 14.

The lower unthreaded portion 34 of the locking screw member 14 is shaped to receive the track wedge member 16. The track wedge member 16 has a centrally located aperture 36 extending from its upper surface 38 to its lower surface 40. The lower end portion 42 of the unthreaded portion 34 is adapted and sized to slip into the aperture 36. The unthreaded portion 34 is encircled with a larger diameter section 44 creating shoulders 44-A and 44-B. In order to lock the apparatus 10 in the track 86, the shoulder 44-B comes into contact with the upper surface 38 of the track wedge member 16 so that the force exerted by the locking screw member 14 will be transmitted through the shoulder 44-B to the track wedge member 16. As illustrated in FIG. 5, when the apparatus 10 is in the unlocked position, the shoulder 44-A comes in contact with the surface 29 of a counter bored section extending from the surface 30 up to threaded apperature 26 preventing the locking screw member 14 from unscrewing past a fixed position whereas the locking screw member 14 will indicate unlocked position when it extends above the upper surface 28 of housing 12. The lower portion 46 of the track wedge member 16 has a reduced diameter and has a substantially circular cross section so that it can be received by an aperture in a locking track in a manner which will be hereinafter more fully described.

In order to retain the track wedge member 16 on the lower portion 42, a washer 48 and a retainer ring 50 are provided. The washer 48 has an aperture 52 which permits it to be slipped over the lower end portion 42 and the locking ring 50 is adapted to then be slipped over the lower end portion 42 so that it rests in the groove 54 and retains the washer 48 and the track wedge member 16 on the lower end portion 42 of the locking screw member 14.

The track slide members 18 and 20 are fastened to the respective underside end portions 56 and 58 of the housing 12 by respective drive screw members 60 and 62 that are forced into the respective apertures 64 and 66 located in the lower portion of the housing 12 as best illustrated in FIG. 5. The track stud members 22 and 24 have respective enlarged cylindrical lower end portions 68 and 70 and respective upper cylindrical threaded portions 72 and 74. These cylindrical end portions 72 and 74 are adapted to fit into the semicircular cut-out portions 76 and 78 in the respective track slide members 18 and 20. In addition, as best illustrated in FIG. 5 the cylindrical threaded upper end portions 72 and 74 are adapted to be screwed into the respective threaded apertures 80 and 82 that extend into the underside of the housing 12. The threaded portion 32 of the locking screw member 14 has a protruding nylon locking member 84 that has a portion thereof extending into threads of the threaded portion 32 so that the locking screw member 14 is held or locked within the aperture 26.

FIG. 2 illustrates the manner in which the locking track apparatus 10 is connected to a portion of a locking track designated by the number 86. In particular FIG. 2 illustrates how the locking track apparatus 10 is locked to the locking track portion 86 when the locking track apparatus is in its locked condition. It should be noted that the locking track portion 86 has an upper surface portion 88 that has respective substantial identical semicircular shaped apertures 90, 92 and 94 that extend completely through the upper surface portion 88 from its upper surface 96 to its lower surface. These apertures 90, 92 and 94 are adapted to receive the lower enlarged portions 68 and 70 of the respective track stud members 22 and 24. The location and the distance between the track stud members 22 and 24 is determined by the respective apertures 80 and 82 and is fixed so that the respective lower end portions 68 and 70 of the track stud members 22 and 24 can be inserted into and received by two of the adjacent located apertures 90, 92 and 94 located in the upper surface portion 88 of the locking track 86.

In locating the locking track apparatus 10 on the locking track 86 the locking track apparatus 10 is placed substantially lengthwise along the upper surface portion 88 and then moved along that upper surface portion 88 until the enlarged portions 68 and 70 of the track stud members 22 and 24 fall into two of the adjacent apertures of the apertures 90, 92 and 94 in the upper surface portion 88 of the locking track 86. After this has occurred the locking track apparatus 10 is moved lengthwise along the locking track 86 until the enlarged portions 68 and 70 are located in between the respective apertures 96 and 92 and 92 and 94. When the locking track apparatus 10 is in this location it cannot be pulled upward away from the locking track 86 since the respective enlarged portions 68 and 70 are larger than the aperture in the respective locking track portions 100 and 102 that are located immediately above the respective enlarged portions 68 and 70.

As illustrated in FIG. 2, the locking track apparatus 10 is locked to the locking track 86 by screwing the locking screw member 14 downward so that the lower portion 46 of the track wedge member 16 is caused to enter into an appropriated aperture such as the aperture 92 in the upper surface portion 88 of the locking track 86. As illustrated in FIG. 2 when the locking screw member 14 is in its fully locked position the underside 47 of the enlarged upper portion 49 of the track wedge member 16 is forced downward upon the upper surface 96 of the upper surface portion 88 of the locking track 86 that is located in the vicinity of the aperture 92. This causes the locking track apparatus 10 to be pushed upward so that the upper surfaces 104 and 106 are forced against the lower surface 98 of the upper surface portion 88 of the locking track 86 that is located in the vicinity of the portions 100 and 102. As a result, the locking track apparatus 10 is securely fastened to the locking track 86. In this connection, it should be noted that any tendency for the locking track apparatus 10 to move lengthwise along the track portion 86 is prevented by the engagement of the lower portion 46 of the track wedge member 16 in the aperture 92.

The manner in which the locking track apparatus 10 is locked to the locking track 86 is also illustrated in FIG. 3. As illustrated in FIG. 3, the lower portion 46 of the track wedge member 16 fits into the aperture 92 when the locking track apparatus 10 is in its locked condition. In addition, the upper surfaces 104 and 106 of the enlarged portions 68 and 70 of the track stud members 22 and 24 clearly engage the lower surface 98 of the upper surface portion 88 of the locking track 86 in the vicinity of the upper surface portions designated by the numbers 100 and 102.

FIGS. 4 and 5 illustrate the locking track apparatus 10 in its assembled and unlocked condition. As illustrated in FIGS. 4 and 5, the locking screw member 14 is threaded into the threaded aperture 26. However, since the locking track apparatus 10 is in its unlocked condition, the locking screw member 14 has its upper portion 108 projecting above the upper surface 28 of the housing 12. This upper portion 108 is suitably colored a brilliant color so that the brilliant color is visible when the locking track apparatus 10 is in its unlocked condition with its upper portion 108 of the locking screw member 14 exposed above the housing 12 as illustrated in FIG. 5. In the absence of adequate light the upper portion 108 of the locking screw member 14 that protrudes above the upper surface 28 of the housing 12 can also be readily felt by the fingers of a hand. This permits an individual to readily determine visually or manually that the locking track apparatus is in its unlocked condition.

As illustrated in FIG. 5, the track wedge member 16 is secured to the lower end portion 42 by means of the washer 48 and the retainer ring 50 that snaps into the groove 54 in the lower portion 42 of the locking screw member 14. It will also be noted that the drive studs 60 and 62 had been inserted into the respective apertures 64 and 66 in the housing 12 so that they secure their respective track slide members 18 and 20 to the underside of the housing 12. In addition, the locking track studs 22 and 24 have their threaded cylindrical end portions 72 and 74 threaded into the respective threaded apertures 80 and 82 in the housing 12 which is accomplished through the use of a screwdriver (not shown) or the like that has its blade inserted into the slots 69 and 71 in the underside of the enlarged portions 68 and 70. The slots 69 and 71 can be used to vary the distance D, which is the distance from the upper surfaces 104 and 106 of the enlarged portions 68 and 70 to the lower surfaces 75 and 77 of the respective track slide members 18 and 20 to accomodate different thicknesses T of the upper surface portion 88 of the locking track 86.

As illustrated in FIGS. 1, 2 and 5, the housing 12 has an aperture 110 extending through it from one side to the other. This aperture 110 is adapted to receive a bolt or the like that is utilized to connect the locking track apparatus 10 to a seat or some type of cargo apparatus (not shown).

The locking track apparatus 10 is used in the following manner. Normally the locking track apparatus 10 would be connected to a vehicle seat or some type of cargo apparatus through the use of the aperture 110. Prior to installing the vehicle seat or the cargo apparatus in a vehicle, the locking track apparatus 10 would be connected to the seat or cargo apparatus. In this connection it should be noted that in normal practice a number of locking track apparatus would be used in connection with a vehicle seat or some type of cargo apparatus. The seat or cargo apparatus with the attached locking track apparatus is located in position inside the vehicle such as the aircraft or the like so that the locking track studs 22 and 24 of the locking track apparatus 10 fit into the apertures such as the apertures 90 and 92 in the locking track 86. The seat or cargo apparatus and the attached locking track apparatus 10 are then moved slightly lengthwise along the locking track 86 so that the enlarged portions 68 and 70 of the locking track studs 22 and 24 are located in between the apertures such as the apertures 90 and 92 and 92 and 94 as illustrated in FIGS. 2 and 3.

The lower portion 46 of the track wedge member 16 is then moved into the aperture 92 by placing a screwdriver or other suitable tool (not shown) into the slot 112 in the upper portion 108 of the locking screw member 14 and turning the locking screw member until its upper surface is substantially flush with the upper surface 28 of the housing 12. The slot 31 in the housing 12 can be utilized to assist in locating the lower end portion 46 of the track wedge member 16 above a suitable aperture such as the aperture 92 in the track portion 86. In this connection, a person that is installing the locking track apparatus 10 can view the locking track wedge member 16 through the slot 31 as the lower portion 46 is about to be inserted into the aperture 92 by turning the locking screw member 14. The same slot 31 can also be used to determine when the locking track apparatus 10 is in its fully locked condition. This is accomplished by determining when the underside 47 of the enlarged upper portion 49 of the track wedge member 16 is located on the upper side 96 of the upper portion 88 of the locking track portion 86. As an additional safety feature, the larger diameter portion 44 of the locking screw member 14 can be colored a suitably brilliant color so that it is readily visible when the locking track apparatus is locked.

The seat or cargo apparatus and its attached locking track apparatus 10 can be readily removed from the locking track 86 to remove the seat or cargo apparatus from a vehicle or to reposition the seat or apparatus inside of the vehicle by simply reversing the above indicated procedure. In a situation where it is desired to merely reposition the seat or apparatus within a vehicle, it is possible to accomplish this in many instances by merely unlocking the locking track apparatus 10 by rotating the locking screw member 14 in a suitable direction so that the lower portion 46 of the track wedge member 16 is pulled out of an aperture such as the aperture 92 in the locking track portion 86. When the wedge member portion 46 has been removed from the aperture in the locking track 86, the undersides of the track slide members 18 and 20 will rest upon the upper surface 96 of the upper portion 88 of the track 86 so that these nonmetallic low friction members 18 and 20 will reduce friction and readily permit the locking track apparatus 10 and any connected seat or cargo apparatus to be slid along the upper surface 96 of the locking track 86 to a suitable desired location within the vehicle.

Although the invention has been described in considerable detail with reference to a certain preferred embodiment, it will be understood that variations and modifications may be made within the spirit and scope of the invention as defined in the appended claims.

What is claimed is:

1. Track fastener apparatus having an unlocked and locked configuration for use with a locking track with an upper surface portion having an upper and lower surface with a slot with spaced cut-out portions extending through the upper surface portion from the upper to the lower surface thereof comprising: a track fastener housing having an upper portion and a lower portion and a threaded aperture extending from the upper portion to the lower portion thereof; means connected to said housing for exerting pressure against the lower surface of the upper surface portion of said locking track at two separate locations along said locking track between said spaced cut-out portions when said track fastener apparatus is in the locked configuration; said means for exerting pressure against the lower surface at two separate locations along said locking track comprising two separated track studs each having an upper portion connected to the lower portion of said track fastener housing on opposite sides of the threaded aperture in said track fastener housing and each having an enlarged lower end portion adapted to fit into the cut-out portions of the upper surface portion of said locking track; plastic sliding means located on the lower portion of said track fastener housing in position to bear upon the upper surface of the upper surface portion of said locking track when said track fastener apparatus is in the unlocked configuration for reducing friction and permitting said track fastener apparatus to be slid along the upper surface of the upper surface portion of said locking track; and means for exerting a force against the upper surface of the upper surface portion of said locking track in the vicinity of one of said spaced cut-out portions when said track fastener apparatus is in the locked configuration; said means for exerting a force against the upper surface in the vicinity of one of said spaced cut-out portions including a track wedge member with an upper surface having a centrally located aperture extending to the upper surface and a locking screw having an unthreaded portion with an end portion sized to slip into the aperture in said track wedge member, said locking screw having an enlarged section located adjacent to the end portion creating a shoulder adapted to contact and exert force upon the upper surface of said track wedge member and a cylindrical threaded portion insertable into the threaded aperture extending from the upper portion to the lower portion of said track fastener housing; said track wedge member having a lower portion sized to be received in the cut-out portions of the upper surface portion of said locking track and an enlarged upper portion adapted to contact the upper surface of the upper surface portion of said locking track in the vicinity of the cut-out which receives the lower portion of said wedge member when said track fastener apparatus is in its locked configuration.

2. The track fastener apparatus of claim 1 wherein said plastic sliding means comprises two separate sliding members each having a portion thereof located adjacent to one of said track studs.

3. The track fastener apparatus of claim 2 wherein the portion of the sliding member located adjacent to said track stud has a cut-out portion for receiving a portion of said track stud.

4. The track fastener apparatus of claim 1 wherein the cylindrical threaded portion of said locking screw has a portion thereof with a distinctive color which is visible when the track fastener apparatus is in the unlocked configuration.

5. The track fastener apparatus of claim 4 wherein the cylindrical threaded portion of said locking screw has locking means for locking said locking screw within the threaded aperture extending from the upper portion to the lower portion of said track fastener housing.

6. The track fastener apparatus of claim 5 wherein said locking means comprises a plastic member protruding from the threaded surface of the cylindrical threaded portion of said locking screw.

7. The track fastener apparatus of claim 6 wherein each track stud has means for accommodating different thicknesses of the upper surface portion of said locking track.

8. The track fastener apparatus of claim 7 wherein said means for accommodating different thicknesses comprises a slot located in the enlarged lower end portions of each of said track studs.

* * * * *